(12) United States Patent
Rofougaran et al.

(10) Patent No.: US 8,634,792 B2
(45) Date of Patent: *Jan. 21, 2014

(54) ADJUSTABLE ANTENNA ASSEMBLY FOR RECEIVE BLOCKING

(71) Applicant: Broadcom Corporation, Irvine, CA (US)

(72) Inventors: Ahmadreza (Reza) Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,247

(22) Filed: Jun. 28, 2013

(65) Prior Publication Data

US 2013/0288628 A1 Oct. 31, 2013

Related U.S. Application Data

(63) Continuation of application No. 11/821,403, filed on Jun. 22, 2007.

(51) Int. Cl.
*H01Q 21/28* (2006.01)

(52) U.S. Cl.
USPC ........ 455/272; 455/562; 455/562.1; 455/134; 455/194.2; 455/63.1; 455/67.13; 455/114.2; 455/278.1; 455/296; 343/756; 343/700; 343/853; 343/693

(58) Field of Classification Search
None
See application file for complete search history.

(56) References Cited

U.S. PATENT DOCUMENTS

| 6,498,591 | B2 * | 12/2002 | Yokogi | 343/893 |
| 6,900,775 | B2 * | 5/2005 | Shapira | 343/844 |
| 7,746,828 | B2 * | 6/2010 | Jalali | 370/334 |
| 2002/0128046 | A1 * | 9/2002 | Fukuhara et al. | 455/562 |
| 2005/0124300 | A1 * | 6/2005 | Khorram | 455/78 |
| 2006/0073801 | A1 * | 4/2006 | Wang et al. | 455/226.1 |
| 2008/0165899 | A1 * | 7/2008 | Rahman et al. | 375/319 |
| 2008/0316130 | A1 * | 12/2008 | Rofougaran et al. | 343/756 |

* cited by examiner

*Primary Examiner* — Yuwen Pan
*Assistant Examiner* — Fanghwa Wang
(74) *Attorney, Agent, or Firm* — Garlick & Markison; Kevin L. Smith

(57) ABSTRACT

An RF receiver section includes an adjustable antenna assembly, a low noise amplifier module, and a down conversion module. The adjustable antenna assembly is configured to provide a first receive antenna structure and a second receive antenna structure. The first and second receive antenna structures receive an inbound wide bandwidth RF signal that includes an interferer RF signal component and a desired inbound RF signal component. The effective polarization of at least one of the first and second receive antenna structures is adjusted to reduce signal strength of the interferer RF signal component.

20 Claims, 13 Drawing Sheets

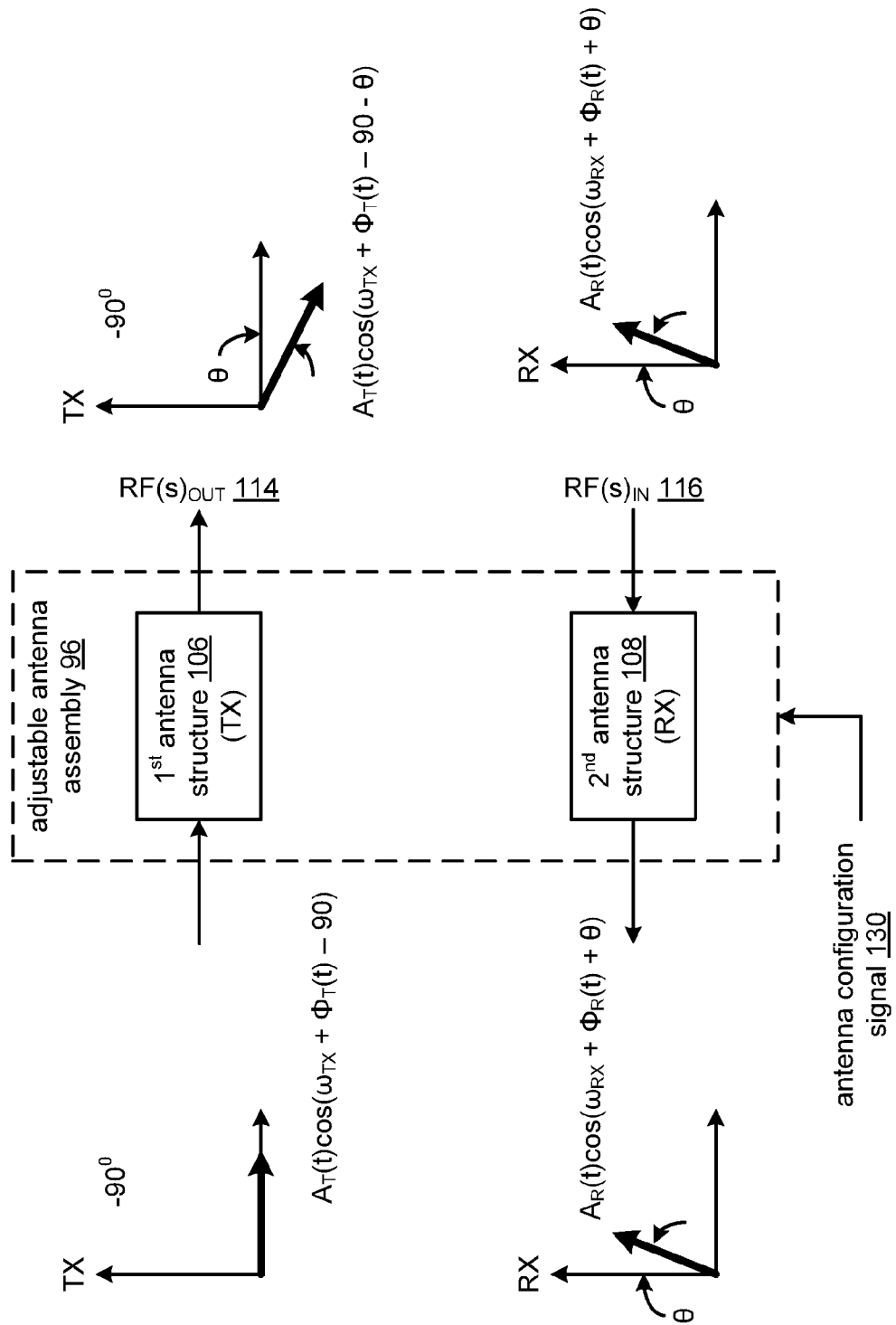

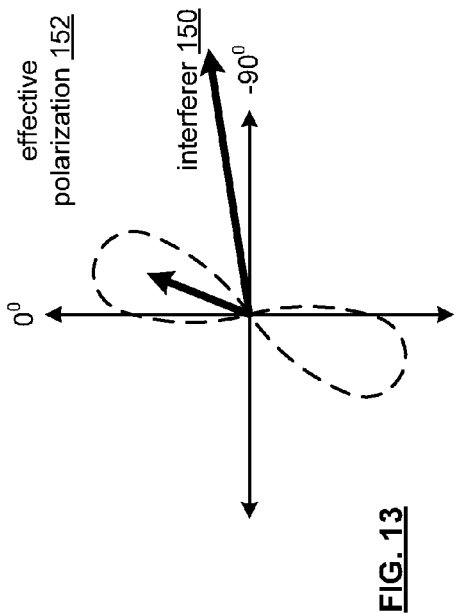
FIG. 13
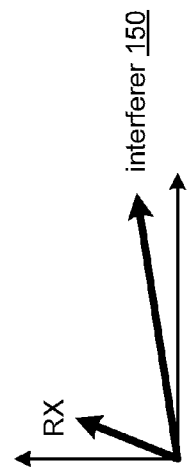
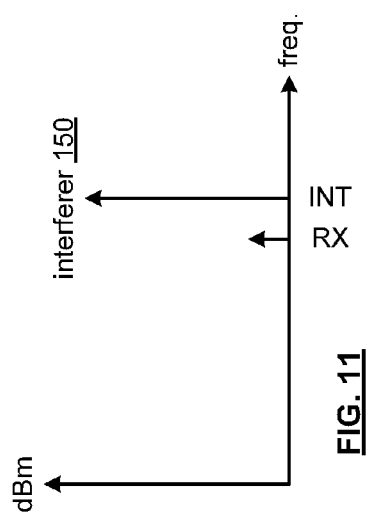
FIG. 11
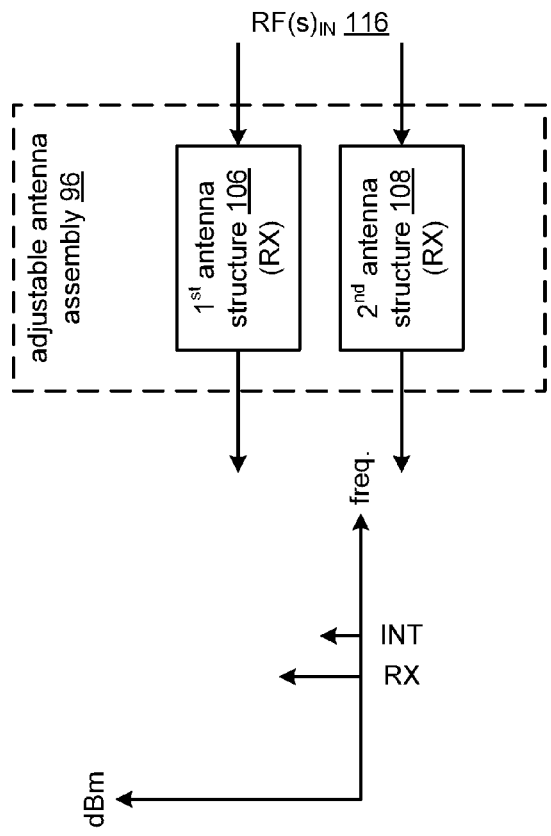
FIG. 12

ADJUSTABLE ANTENNA ASSEMBLY FOR RECEIVE BLOCKING

CROSS REFERENCE TO RELATED PATENTS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. Utility application Ser. No. 11/821,403, entitled "ADJUSTABLE ANTENNA ASSEMBLY FOR RECEIVE BLOCKING," filed Jun. 22, 2007, now issued as U.S. Pat. No. 8,576,133, on Nov. 5, 2013.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to antennas used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Since the wireless part of a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, the same polarization, different polarization, and/or any number of other electro-magnetic properties.

One popular antenna structure for RF transceivers is a three-dimensional in-air helix antenna, which resembles an expanded spring. The in-air helix antenna provides a magnetic omni-directional mono pole antenna, but occupies a significant amount of space and its three dimensional aspects cannot be implemented on a planer substrate, such as a printed circuit board (PCB).

For PCB implemented antennas, the antenna has a meandering pattern on one surface of the PCB. Such an antenna consumes a relatively large area of the PCB. For example, a ¼ wavelength antenna at 900 MHz has a total length of approximately 8 centimeters (i.e., 0.25*32 cm, which is the approximate wavelength of a 900 MHz signal). As another example, a ¼ wavelength antenna at 2400 MHz has a total length of approximately 3 cm (i.e., 0.25*12.5 cm, which is the approximate wavelength of a 2400 MH signal). Even with a tight meandering pattern, a single 900 MHz antenna consumes approximately 4 $cm^2$.

If the RF transceiver is a multiple band transceiver (e.g., 900 MHz and 2400 MHz), provides beamforming, provides polarization, provides diversity, and/or provides multiple in-band communications, then two antennas are needed, which consumes even more PCB space. In addition, due to multiple path fading, the received signals have distortion (e.g., amplitude error and/or phase error) with respect to the transmitted signals. There are many solutions to overcome this problem once the received RF signals are converted to baseband, however, there are few, if any, solutions to correct this problem in RF.

Therefore, a need exists for an antenna assembly and applications thereof that overcomes at least some of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 10 is a schematic block diagram of another embodiment of an adjustable antenna assembly in accordance with the present invention;

FIG. 11 is a diagram of an example of an interfering RF signal and a receive RF signal in the frequency domain in accordance with the present invention;

FIG. 12 is a diagram of an example of a receive antenna pattern in accordance with the present invention;

FIG. 13 is a schematic block diagram of another embodiment of an adjustable antenna assembly in accordance with the present invention;

DETAILED DESCRIPTION OF THE INVENTION

Figure 1:
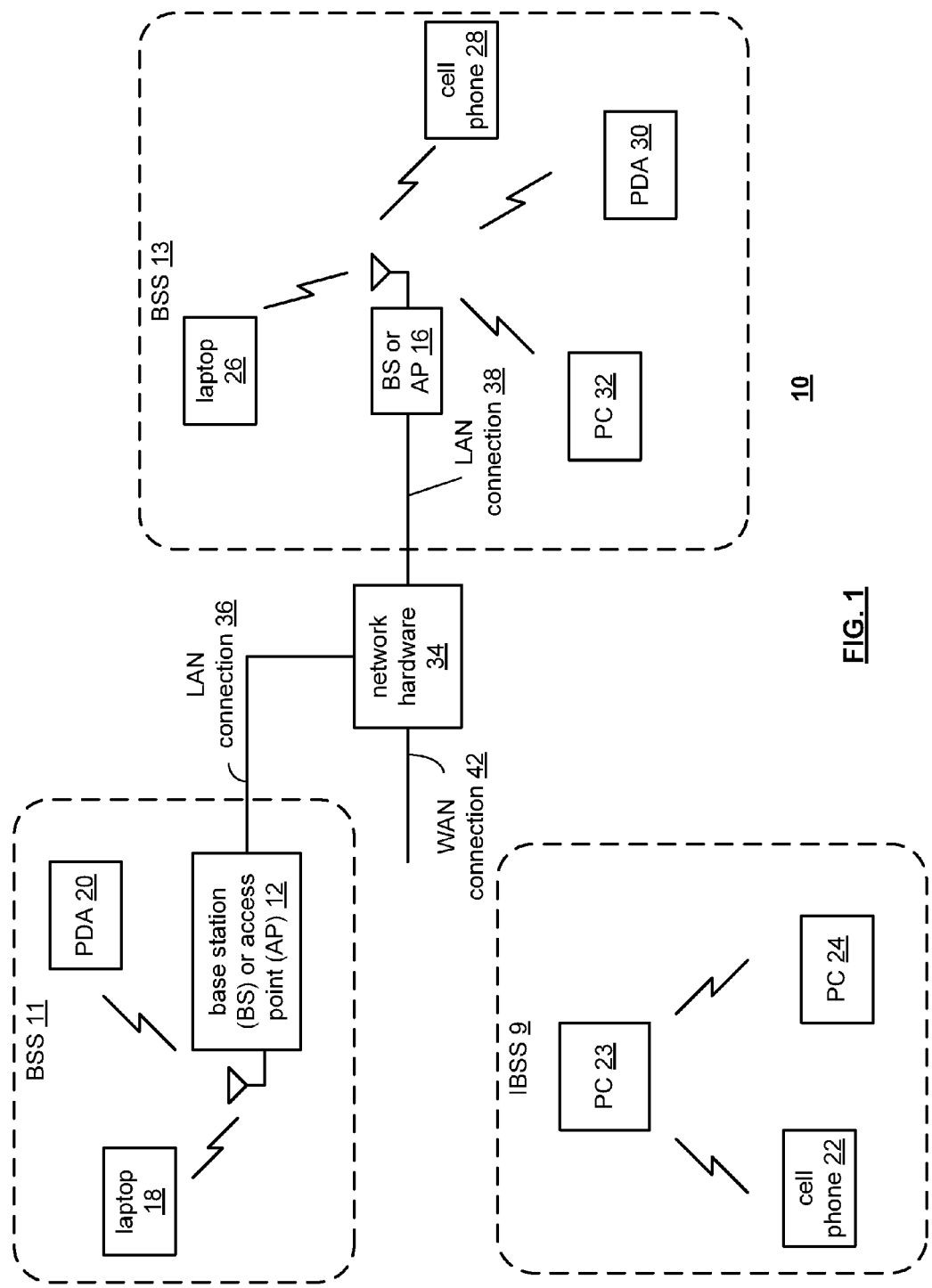
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to one or more of FIGS. 2-17.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
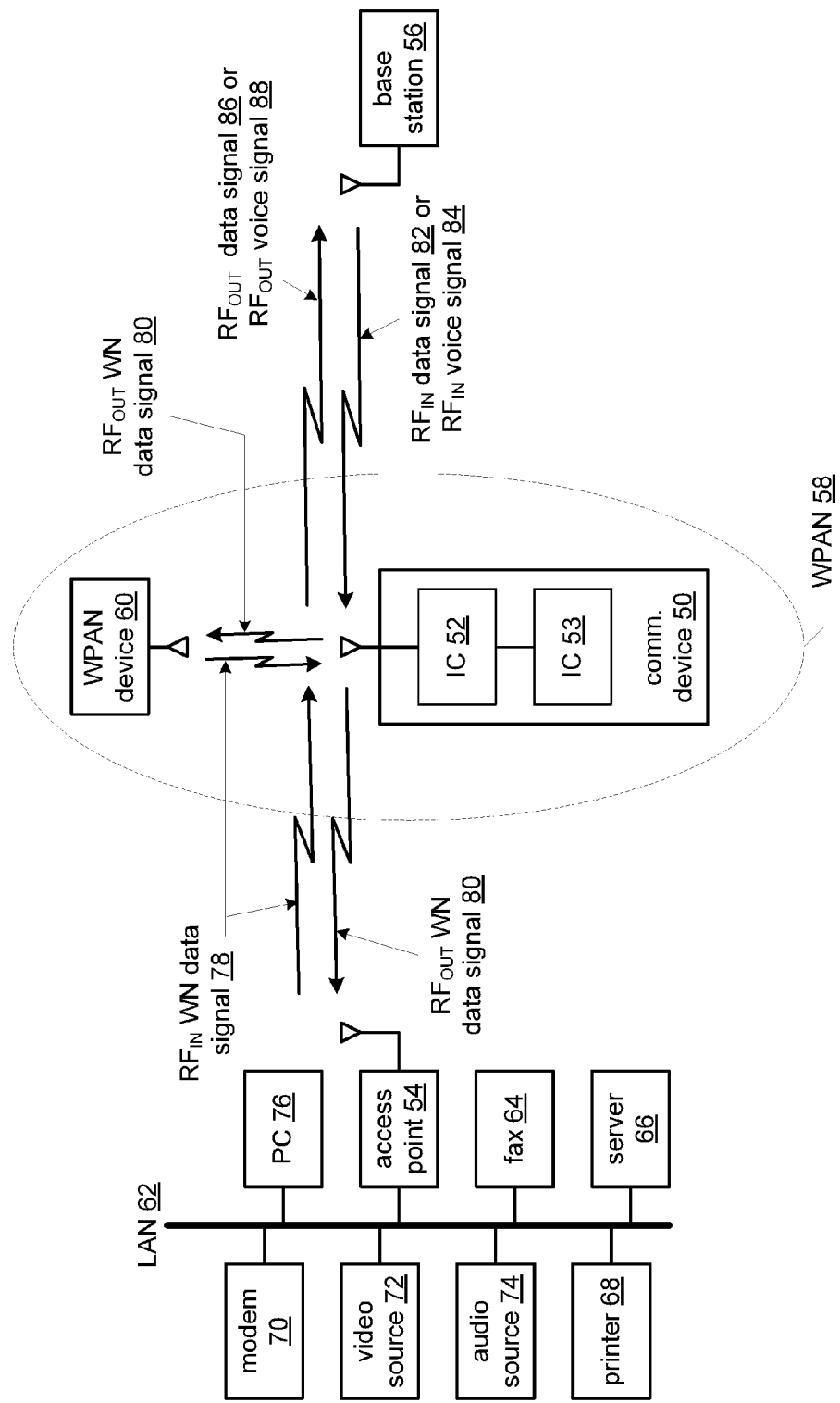
FIG. 2 is a schematic block diagram of an embodiment of a wireless communication device in accordance with the present invention.

FIG. 2 is a schematic block diagram of another embodiment of a wireless communication system that includes a communication device 50 associated with a cellular network, a wireless local area network (WLAN) and/or a wireless personal area network (WPAN) 58. The WLAN network is shown to include an access point 54, a local area network (LAN) bus 62, a modem 70, a video source 72, an audio source 74, a printer 68, a personal computer (PC) 76, a facsimile machine (fax) 64, and a server 66, but may include more or less components than shown. The cellular network is shown to include a base station 56, which may support voice communications and/or data communications. Note that the cellular network may include more components than the base station 56. The WPAN 58 includes at least one WPAN device 60 that is proximal to the communication device 50. Note that the WPAN device 60 may be a Bluetooth headset, a wireless microphone, a wireless speaker, a wireless display, and/or a wireless data entry unit.

In this embodiment, the communication device 50, which may be one of the communication devices 18-32 of FIG. 1 or another type of communication device, includes one or more integrated circuits (IC) 52 and 53 to communication with the cellular network, the WLAN, and/or the WPAN. Such a communication may include voice communications, audio communications, video communications, graphics communications, text communications, and/or data communications (e.g., emails, web browsing, short message services, etc.). For example, the communication device 50 may be receiving an audio file from the audio source 74 (e.g., a computer storing an MP3 file, a radio receiver, a cable set top box, a satellite receiver, a CD player, etc.), the server 66, and/or the PC 76 via the access point 54 as an inbound RF wireless network (WN) data signal 78. The IC 52 and/or 53 processes the inbound RF WN data signal 78 to produce inbound data that may be rendered audible by speaker circuitry of the IC 52 and/or communication device 50. Alternatively and/or in addition to, the IC 52 and/or 53 may convert the inbound data signal from the WLAN to an outbound RF WN data signal 80 that is provided to the WPAN device 60, which may reproduce the inbound data for presentation (e.g., render it audible).

As another example, the communication device 50 may be receiving a video file from the video source 72 (e.g., a computer storing a video file, a cable set top box, a satellite receiver, a DVDD player, etc.), the server 66, and/or the PC 76 via the access point 54 as an inbound RF WN data signal 78. The IC 52 and/or 53 processes the inbound RF WN data signal 78 to produce inbound data that may be presented on a display (e.g., speakers and LCD, DLP, or plasma display panel) of the communication device 50. Alternatively and/or in addition to, the IC 52 may convert the inbound data signal from the WLAN to an outbound RF WN data signal 80 that is provided to the WPAN device 60, which may reproduce the inbound data for presentation (e.g., play the video file).

As yet another example, the communication device 50 may record video, voice, and/or audio to produce a recorded file. In this example, the IC 52 and/or 53 may convert the recorded file into an outbound RF WN data signal 80 that is provided to the WLAN. The access point 54 recovers the recorded file and provides it to one of the other devices (e.g., PC 76, server 66, modem 70) for storage and/or forwarding onto the Internet.

As a further example, the modem 70, the PC 76, the server 66, the fax 64, and/or the printer 68 may provide a file to the access point 54 for communication to the communication device 50. In this instance, the access point 54 converts the file into the inbound WN data signal 78. The IC 52 and/or 53 processes the received the inbound WN data signal 78 to recapture the file, which may be presented on the communication device 50 and/or provided to the WPAN device 60.

As yet a further example, the communication device 50 may have a graphics, text, and/or a data file for communication to a component of the WLAN. In this example, the IC 52 and/or 53 converts the graphics, text, and/or data file into the outbound RF WN data signal 80 that is provided to the access point 54 and/or to the WPAN 60. In one embodiment, the access point 54 recovers the graphics, text, and/or data file and provides it to the PC 76, the modem 70, the fax 64, the printer 68, and/or the server 66. Note that the file may include an address that identifies which component(s) of the WLAN are to receive the file.

More examples include voice and/or data communications between the communication device 50 and the base station 56 in accordance with one or more cellular communication standards, which includes, but is not limited to, past, present, and/or future versions of GSM, CDMA, wideband CDMA (WCDMA), EDGE, GPRS, AMPS, and digital AMPS. For instance, the IC 52 and/or 53 may process outbound voice signals to produce outbound RF voice signals 88 and process inbound RF voice signals 84 to produce inbound voice signals. The IC 52 and/or 53 may facilitate the presentation of the inbound and outbound voice signals on the communication device 50 and/or transceive them with the WPAN device 60 as the inbound and outbound WN data signals 78 and 80. Further the IC 52 and/or 53 may process outbound data signals to produce outbound RF data signals 86 and process inbound RF data signals 82 to produce inbound data signals. The IC 52 and/or 53 may facilitate the presentation of the inbound and outbound data signals on the communication device 50 and/or transceive them with the WPAN device 60 as the inbound and outbound WN data signals 78 and 80.

Figure 3:
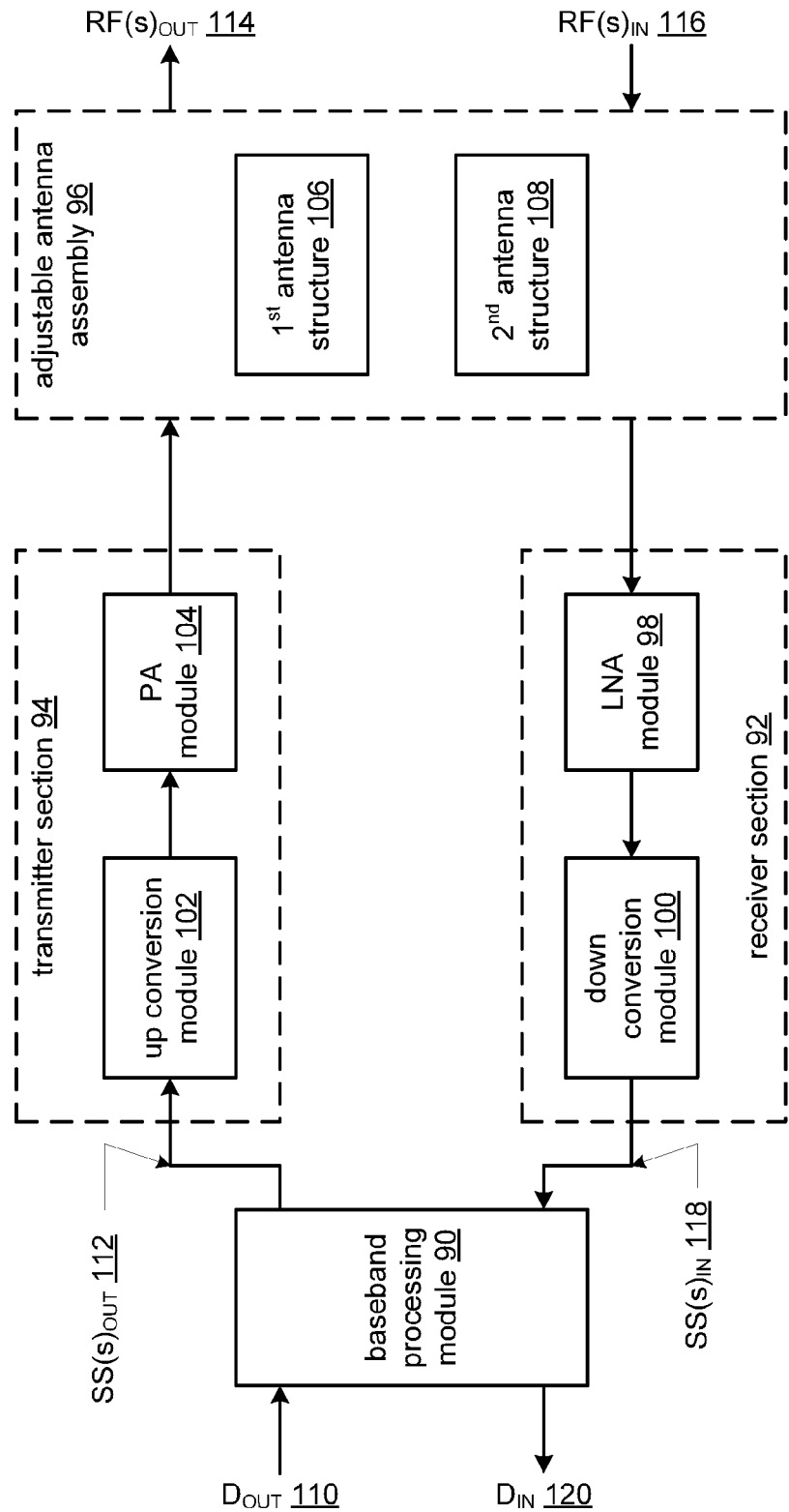
FIG. 3 is a schematic block diagram of another embodiment of a wireless communication device in accordance with the present invention.

FIG. 3 is a schematic block diagram of another embodiment of a wireless communication device 50 that includes a baseband processing module 90, a receiver section 92, a transmitter section 94, and an adjustable antenna assembly 96. The receiver section 92 includes a low noise amplifier (LNA) module 98 and a down conversion module 100. The transmitter section 94 includes an up conversion module 102 and a power amplifier (PA) module 104. The adjustable antenna assembly 96 may be configured to provide one or more antenna structures 106 and 108. The baseband processing module 90, the transmitter section 94, the receiver section 92, and at least a part of the adjustable antenna assembly 96 may be implemented on one or more the ICs 52 and/or 53.

The baseband processing module 90 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 3-17.

In operation, the baseband processing module 90 converts outbound data 110 (e.g., voice, text messages, audio files, video files, image files, graphics, etc.) into one or more outbound symbol streams 112 in accordance with one or more wireless communication protocols (e.g., past, present, and/or future versions of GSM, CDMA, wideband CDMA (WCDMA), EDGE, GPRS, AMPS, digital AMPS, IEEE 802.11, Bluetooth, ZigBee, and/or any other type of wireless network protocol). The outbound symbol stream 112 may include in-phase and quadrature components, phase modulation component, amplitude modulation component, and/or a frequency modulation component.

The up conversion module 102 converts the one or more outbound symbol stream 112 into one or more up converted signals in accordance with a local oscillation. The power amplifier module 104 amplifies the one or more up converted signals and may further amplitude modulate the one or more up converted signals to produce one or more outbound RF signals 114. The adjustable antenna assembly 96 is configured to provide one or more antenna structures 106 and/or 108 to transmit the one or more outbound RF signals 114.

The adjustable antenna assembly 96 is also configured to provide one or more antenna structures 106 and/or 108 to receive one or more inbound RF signals 116. The LNA module 98, embodiments of which will be described with reference to FIGS. 8, 9, and 14-17, amplifies the one or more inbound RF signals 116 to produce one or more amplified inbound RF signals. The down conversion module 100 converts the one or more amplified inbound RF signals into one or more inbound symbol streams 118. The baseband processing module 90 converts the one or more inbound symbol streams 118 into the inbound data 120.

Figure 4:
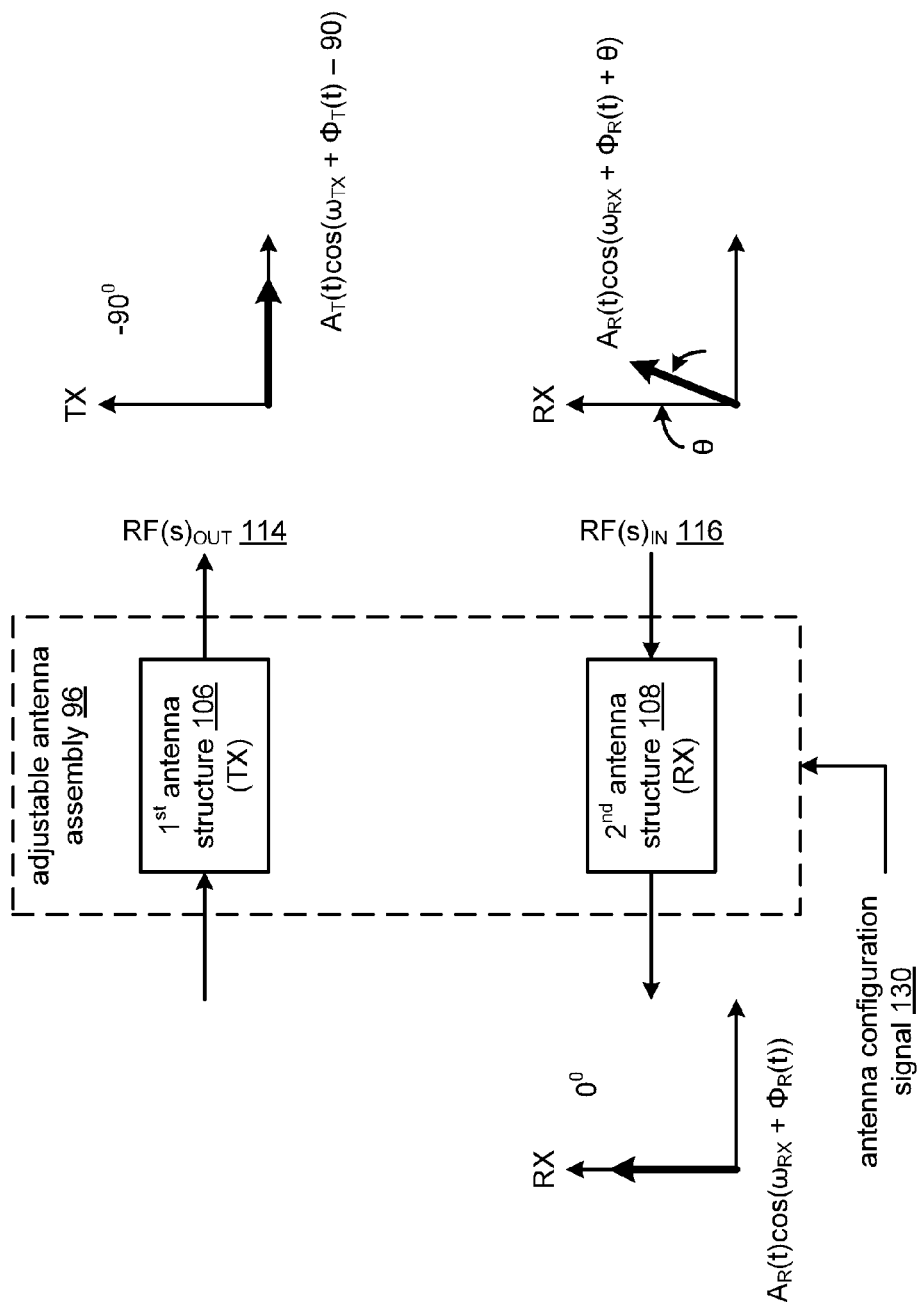
FIG. 4 is a schematic block diagram of an embodiment of an adjustable antenna assembly in accordance with the present invention.

FIG. 4 is a schematic block diagram of an embodiment of an adjustable antenna assembly 96 that is configured to provide a first antenna structure 106 and a second antenna structure 108 in accordance with an antenna configuration signal 130. In this embodiment, the first antenna structure 106 supports the transmission of the one or more outbound RF signals 114 and the second antenna structure 108 supports the reception of the one or more inbound RF signals 116. Note that the baseband processing module 90 may generate the antenna configuration signal 130 in accordance with the particular wireless communication protocol being supported by the communication device 50. Further note that, when the antenna configuration signal is in a first state, the adjustable antenna assembly provides the receive and transmit antenna structures for operation in a first operating frequency band and, when the antenna configuration signal is in a second state, the adjustable antenna assembly provides the receive and transmit antenna structures for operation in a second operating frequency band.

In this embodiment, the one or more inbound RF signals 116 are desired to be orthogonal to the one or more outbound RF signals 114. However, due to multipath fading and/or other RF transmission factors, when the one or more inbound RF signals 116 are received via the adjustable antenna assembly 96, the one or more inbound RF signals 116 are not orthogonal to the one or more outbound RF signals. In this instance, the effective polarization of the second antenna structure is adjusted such that the one or more inbound RF signals provided to the LNA module 98 are substantially orthogonal to the one or more outbound RF signals 114.

The effective polarization may be adjusted by physically changing the orientation of the second antenna structure 108, by changing the characteristics (e.g., quality factor, length, bandwidth, impedance, frequency response, etc.) of one or more antennas of the second antenna structure 108, and/or by changing the characteristics (e.g., impedance, filtering response, phase rotation, amplitude adjustment, etc.) of one or more antenna interface modules of the second antenna structure 108. Note that the substantially orthogonal polarization includes left hand and right hand circular polarization and/or 0°-90° polarization.

FIG. 4 further illustrates an example of obtaining a 0°-90° polarization between the inbound and outbound RF signals. As shown, the outbound RF signal 114 may be expressed as $A_T(t)\cos(\omega_{TX}+\Phi_T(t)-90)$ and the received inbound RF signal 116 may be expressed as $A_R(t)\cos(\omega_{RX}+\Phi_R(t)+\theta)$, where A(t) represents the amplitude modulation information (e.g., amplitude for polar coordinates or $A(t)=\sqrt{(A_I(t)^2+A_Q(t)^2)}$ for Cartesian coordinates), $\Phi$ represents the phase modulation information (e.g., phase for polar coordinates or $\tan^{-1}(A_Q/A_I)$ for Cartesian coordinates), and $\theta$ represents the polarization offset. Accordingly, the adjusting of the second antenna structure 108 is done to compensate for the polarization offset such that the resulting inbound RF signal may be expressed as $A_R(t)\cos(\omega_{RX}+\Phi_R(t))$.

In an embodiment, the adjusting the effective polarization of the receive antenna structure may be done by comparing polar coordinates of the inbound RF signal with polar coordinates of the outbound RF signal. When the polar coordinates of the inbound RF signal are not substantially orthogonal with the polar coordinates of the outbound RF signal, adjusting the effective polarization of the receive antenna structure such that the polar coordinates of the inbound RF signal are substantially orthogonal with the polar coordinates of the outbound RF signal.

Figure 5:
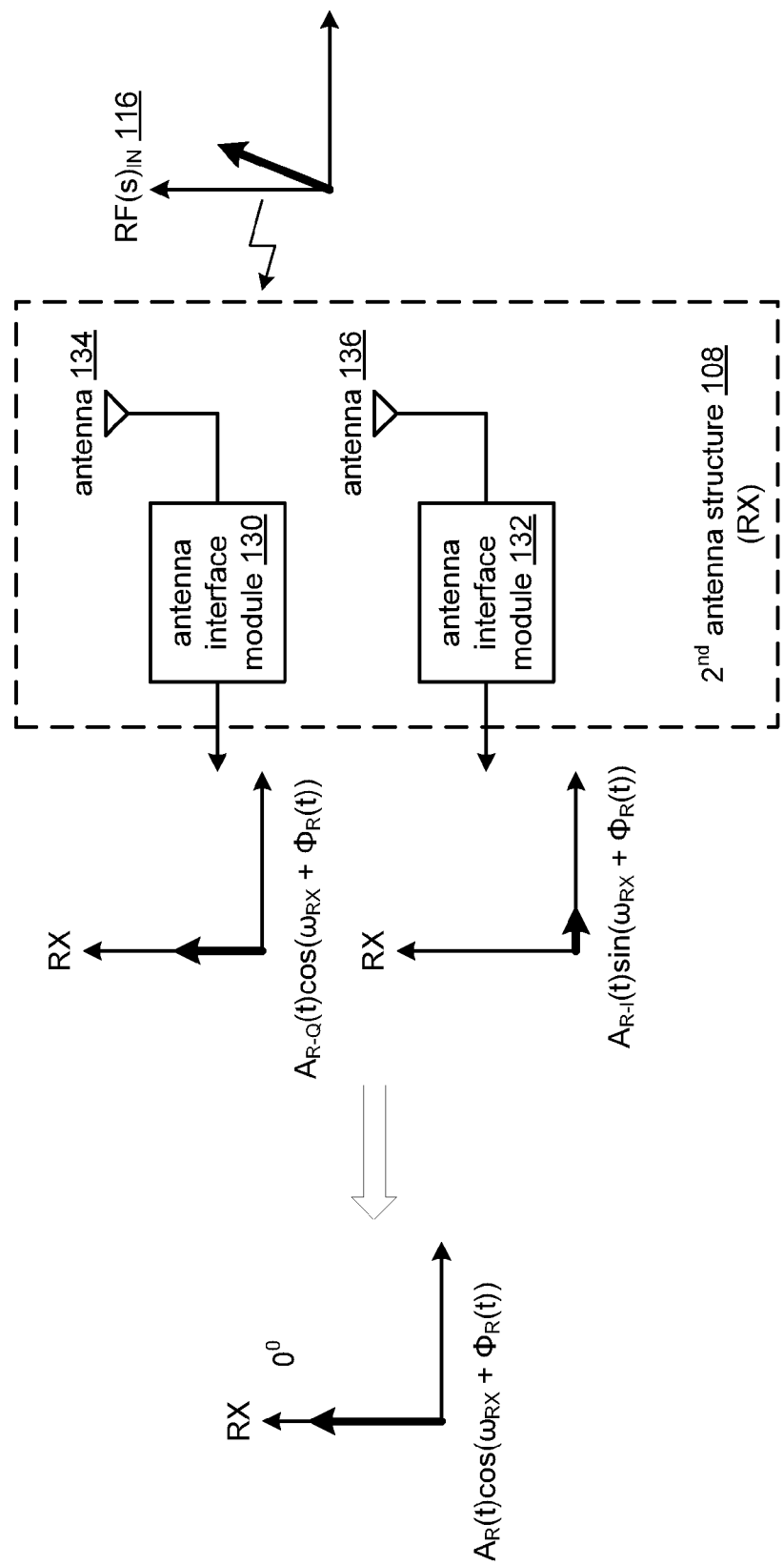
FIG. 5 is a schematic block diagram of an embodiment of an antenna structure in accordance with the present invention.

FIG. 5 is a schematic block diagram of an embodiment of an antenna structure 108 that includes a plurality of antennas 134-136 and a plurality of antenna interfaces 130-132. Each of the antennas 134-136 may be a dipole antenna, a mono pole antenna, a diversity antenna pair, a planer helical antenna, a meandering trace antenna, and/or any other antenna capable of transceiving RF signals. Each of the antenna interfaces 130-132 may include a transformer balun, an impedance matching circuit, and/or a transmission line.

To determine the polarization offset, the antenna structure 108 may receive an inbound RF training sequence, which may be part of the inbound RF signal 116 or may be the inbound RF signal 116. For example, the inbound RF training sequence may be the short and/or long training sequence of a WLAN communication. As another example, the inbound RF signal 116 may only include a training sequence. Regardless of the particular formatting of the inbound RF training sequence, it has known transmission characteristics. The known transmission characteristics may include amplitude, phase, transmission power, frequency, tone pattern, transmission polarization, transmission beamforming, and/or any other controllable aspect of a transmitted RF signal.

After receiving the inbound RF training sequence, the device determines reception characteristics of the inbound RF training sequence received by the antennas 13-136 to produce first and second reception characteristics (e.g., amplitude, phase, received signal strength, frequency, tone pattern, polarization, beamforming, and/or any other controllable aspect of the transmitted RF signal). In an embodiment, each of the received inbound RF training sequences is down converted to a baseband signal, which is processed by the baseband processing module to determine the reception characteristics. The polarization offset is determined based on a difference between the first and second reception characteristics and the known transmission characteristics, where the polarization offset is used to adjust the effective polarization of the receive antenna structure. Note that by adjusting characteristics of the one or more antenna interface modules and/ or by adjusting characteristics of the one or more antennas adjusted the effective polarization is adjusted.

As an example, the inbound RF training sequence is the inbound RF signal 116, which may be expressed as $A_R(t)\cos(\omega_{RX}+\omega_R(t)+\theta)$, where A(t) represents the amplitude modulation information, Φ represents the phase modulation information, and θ represents the polarization offset. The first antenna 134 is orientated to receive a 0° representation of the inbound RF signal 116 and the second antenna 136 is orientated to receive a −90° representation of the inbound RF signal 116. As such, the 0° representation may be expressed as $A_{RQ}(t)\cos(\omega_{RX}+\Phi_R(t))$ and the −90° representation may be expressed as $A_{RI}(t)\cos(\omega_{RX}+\Phi_R(t)-90)$. From these signals and the known transmission characteristics, the polarization offset θ may be determined as $\tan^{-1}(A_{RQ}/A_{RI})$+/− the known transmission polarization, and the magnitude of the desired orthogonal inbound RF signal may be determined as $A_R(t)=\sqrt{(A_{RI}(t)^2+A_{RQ}(t)^2)}$ with respect to the known transmission characteristics.

Figure 6:
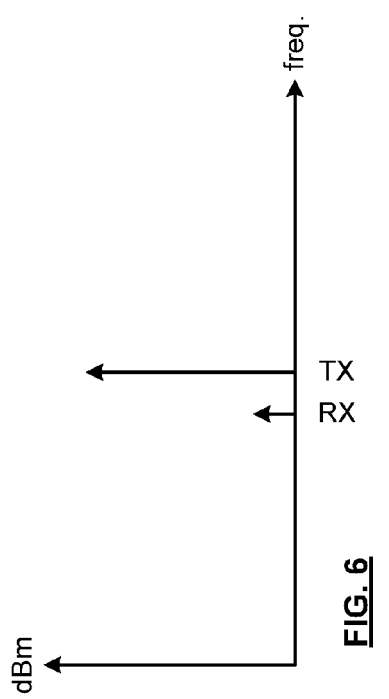
FIG. 6 is a diagram of an example of a transmit RF signal and a receive RF signal in the frequency domain in accordance with the present invention.

FIG. 6 is a diagram of an example of a transmit (TX) RF signal and a receive (RX) RF signal in the frequency domain. As shown, the transmit, or outbound, RF signal at the frequency TX has a much greater power level (in dBm) than the receive, or inbound, RF signal at the frequency RX. When this discrepancy in power levels exists, the outbound RF signal can interfere with the reception and subsequent processing of the inbound RF signal.

Figure 7:
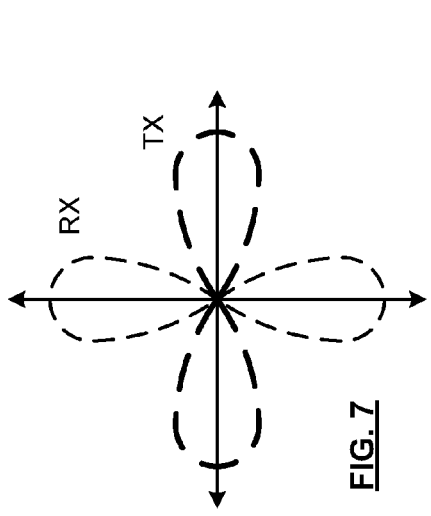
FIG. 7 is a diagram of an example of a transmit antenna pattern and a receive antenna pattern in accordance with the present invention.

FIG. 7 is a diagram of an example of a transmit (TX) antenna pattern and a receive (RX) antenna pattern. In this example, the TX antenna pattern is orthogonal to the RX antenna pattern, which reduces the interference of the TX signal on the RX signal by a significant amount (e.g., 10 dB or more). If the orthogonal relationship is not maintained, the rejection of the TX signal by the RX antenna(s) is reduced, thereby increasing the interference. As such, by maintaining an orthogonal relationship between the RX antenna and the TX antenna as discussed above, the desired TX blocking (i.e., attenuation) is achieved.

Figure 8:
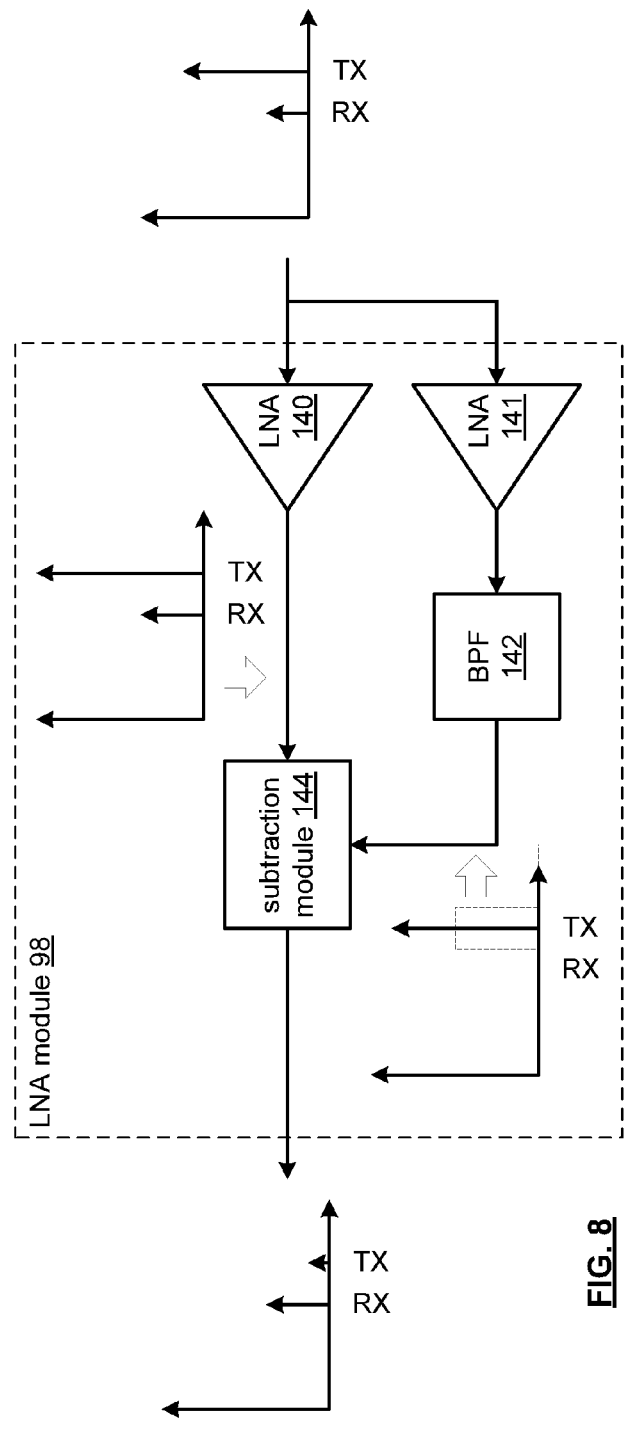
FIG. 8 is a schematic block diagram of an embodiment of a low noise amplifier module in accordance with the present invention.
Figure 9:
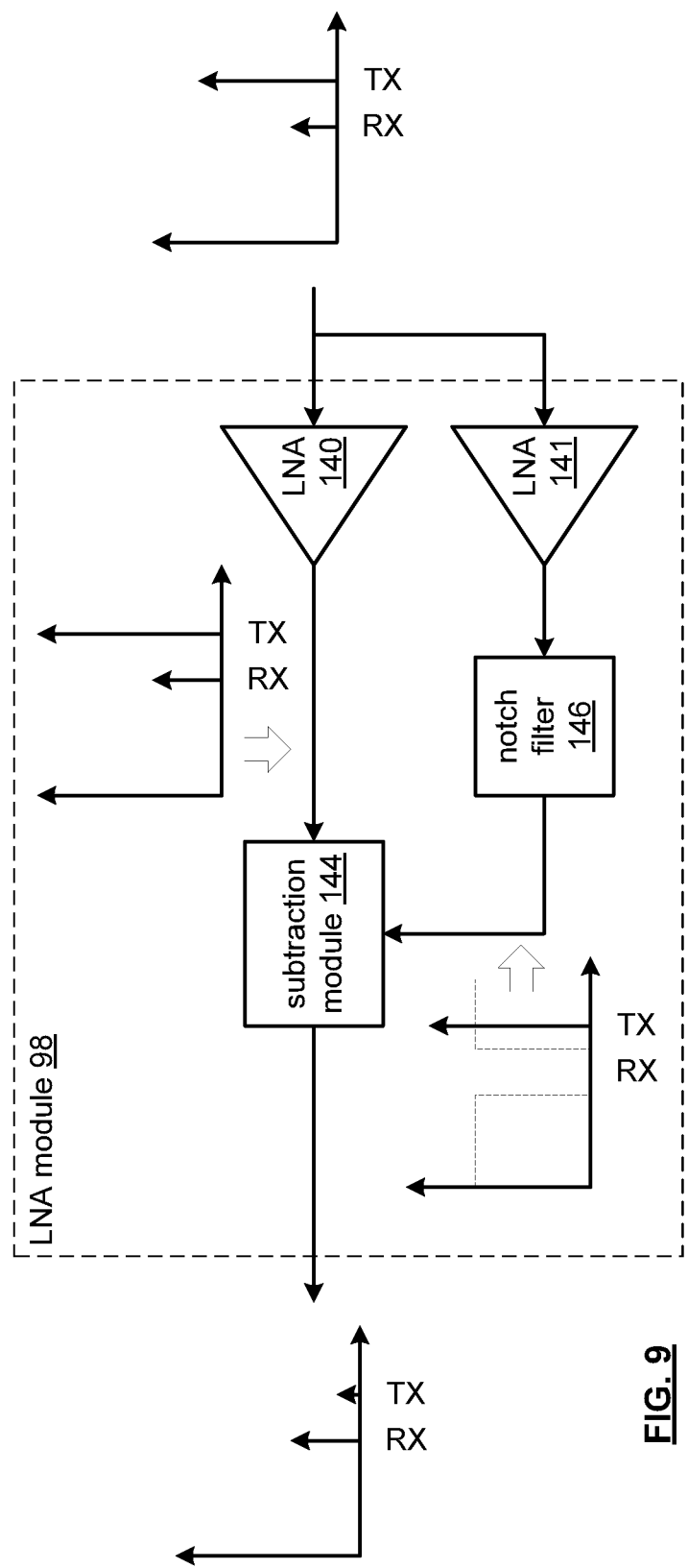
FIG. 9 is a schematic block diagram of another embodiment of a low noise amplifier module in accordance with the present invention.

If the signal strength of the inbound RF signal is greater than a certain level (e.g., greater than −50 dBm), then adequate blocking of the outbound RF signal can be achieved by maintaining the orthogonal relationship of the RX and TX antennas. If, however, the signal strength of the inbound RF signal is less than the certain level, then additional blocking of the outbound RF signal (e.g., the TX signal) may be required. FIGS. 8 and 9 are schematic block diagrams of embodiments of the LNA module 98 that includes TX blocking functionality.

FIG. 8 is a schematic block diagram of an embodiment of a low noise amplifier module 98 that includes a pair of low noise amplifiers 140, 141, a band pass filter (BPF) 142, and a subtraction module 144. The LNAs 140 and 141 amplify the inbound RF signal (RX) and a blocking component corresponding to the outbound RF signal (TX) to produce amplified composite inbound RF signals. The output of the LNA 141 is band pass filtered by BPF 142 to pass the blocker component and to substantially block signal components outside of the transmit frequency band to produce a band pass filtered signal.

The subtraction module 144 subtracts the band pass filtered signal from the amplified composite inbound RF signal outputted by LNA 140 to produce an amplified inbound RF signal. As shown, the amplified inbound RF signal includes the desired inbound RF signal component and a substantially attenuated blocker component.

FIG. 9 is a schematic block diagram of another embodiment of a low noise amplifier module 98 that includes the pair of low noise amplifiers 140, 141, a notch filter 146, and the subtraction module 144. The LNAs 140 and 141 amplify the inbound RF signal (RX) and a blocking component corresponding to the outbound RF signal (TX) to produce amplified composite inbound RF signals. The output of the LNA 141 is notched filtered by notch filter 146 to attenuate signal components within the receive frequency band (RX) and to pass signal components outside of the receive frequency band to produce a notch filtered signal.

The subtraction module 144 subtracts the notch filtered signal from the amplified composite inbound RF signal outputted by LNA 140 to produce an amplified inbound RF signal. As shown, the amplified inbound RF signal includes the desired inbound RF signal component and a substantially attenuated blocker component.

FIG. 10 is a schematic block diagram of another embodiment of an adjustable antenna assembly 96 that is configured to provide a first antenna structure 106 and a second antenna structure 108 in accordance with an antenna configuration signal 130. In this embodiment, the first antenna structure 106 supports the transmission of the one or more outbound RF signals 114 and the second antenna structure 108 supports the reception of the one or more inbound RF signals 116.

In this embodiment, the one or more inbound RF signals 116 are desired to be orthogonal to the one or more outbound RF signals 114. However, due to multipath fading and/or other RF transmission factors, when the one or more inbound RF signals 116 are received via the adjustable antenna assembly 96, the one or more inbound RF signals 116 are not orthogonal to the one or more outbound RF signals. In this instance, the effective polarization of the first antenna structure 106 is adjusted such that the one or more outbound RF signals 114 transmitted by the PA module 104 are substantially orthogonal to the one or more inbound RF signals 116.

The effective polarization may be adjusted by physically changing the orientation of the first antenna structure 106, by changing the characteristics (e.g., quality factor, length, bandwidth, impedance, frequency response, etc.) of one or more antennas of the first antenna structure 106, and/or by changing the characteristics (e.g., impedance, filtering response, phase rotation, amplitude adjustment, etc.) of one more antenna interface modules of the first antenna structure 106. Note that the substantially orthogonal polarization includes left hand and right hand circular polarization and/or 0°-90° polarization.

As an example of obtaining a 0°-90° polarization between the inbound and outbound RF signals, the outbound RF signal 114 received by the adjustable antenna assembly 96 may be expressed as $A_T(t)\cos(\omega_{TX}+\Phi_T(t)-90)$ and the received inbound RF signal 116 received by the adjustable antenna assembly 96 may be expressed as $A_R(t)\cos(\omega_{RX}+\Phi_R(t)+\theta)$, where A(t) represents the amplitude modulation information, Φ represents the phase modulation information, and θ represents the polarization offset. Accordingly, the adjusting of the first antenna structure 106 is done to compensate for the polarization offset such that the resulting outbound RF signal may be expressed as $A_T(t)\cos(\omega_{TX}+\Phi_T(t)-90-\theta)$.

FIG. 11 is a diagram of an example of an interfering RF signal 150 and a receive (RX) RF signal in the frequency domain. As shown, the interferer 150 at the frequency INT has a much greater power level (in dBm) than the receive, or inbound, RF signal at the frequency RX. When this discrepancy in power levels exists, the interferer 150 (which may be caused by the transmission of another wireless communication device, access point, base station, radio tower, etc. in the proximal area of the present communication device) can interfere with the reception and subsequent processing of the inbound RF signal.

FIG. 12 is a diagram of an example of adjusting the receive (RX) antenna pattern to reduce the received signal strength of the interferer 150. In this example, the RX antenna pattern, or effective polarization 152, is aligned with the receive signal, which reduces the interference of the interferer on the RX signal by a significant amount (e.g., 10 dB or more).

FIG. 13 is a schematic block diagram of another embodiment of an adjustable antenna assembly 96 configured to provide a first and second antenna structure 106 and 108. In this embodiment, both antenna structures 106 and 108 are receiving an inbound RF signal 116 and an interferer 150. In another embodiment, the adjustable antenna assembly 96 may provide one antenna structure 106 or 108 to receive the inbound RF signal 116 and the interferer 150. Regardless of the particular embodiment, the effective polarization of the first and/or the second receive antenna structure 106 and/or 108 is adjusted to reduce signal strength of the interferer RF signal component 150.

In an embodiment, the effective polarization may be determined by placing the adjustable antenna assembly in a first configuration (e.g., a first polarization orientation of the antenna structures and/or a first beamforming relationship between the antenna structures). In this configuration, the signal strength of the inbound wide bandwidth RF signal and the signal strength of the desired inbound RF signal component are determined. In general, the inbound wide bandwidth RF signal includes the desired inbound RF signal at frequency RX and the interferer 150 at frequency INT and the desired inbound RF signal includes the inbound RF signal at frequency RX.

The adjustable antenna assembly is then reconfigured into in another configuration. In this new configuration, the signal strength of the inbound wide bandwidth RF signal and the signal strength of the desired inbound RF signal component are again determined. The adjustable antenna assembly may be reconfigured more than twice to obtain more signal strength per configuration data.

Once the adjustable antenna assembly has been reconfigured twice, or more times as desired, the effective polarization is determined based on the signal strength of the inbound wide bandwidth RF signal in the first and second configurations and the signal strength of the desired inbound RF signal component in the first and second configurations. For example, the effective polarization may be selected to correspond to the configuration providing a desired wide bandwidth to narrow bandwidth ratio (e.g., the configuration providing the smallest wide bandwidth signal strength versus the signal strength of the desired inbound RF signal). Alternatively, the signal strengths may be used to calculate the relative polar relationship between the interferer and the desired inbound RF signal and, based on the relative polar relationship, the polarization offset is determined.

Figure 14:
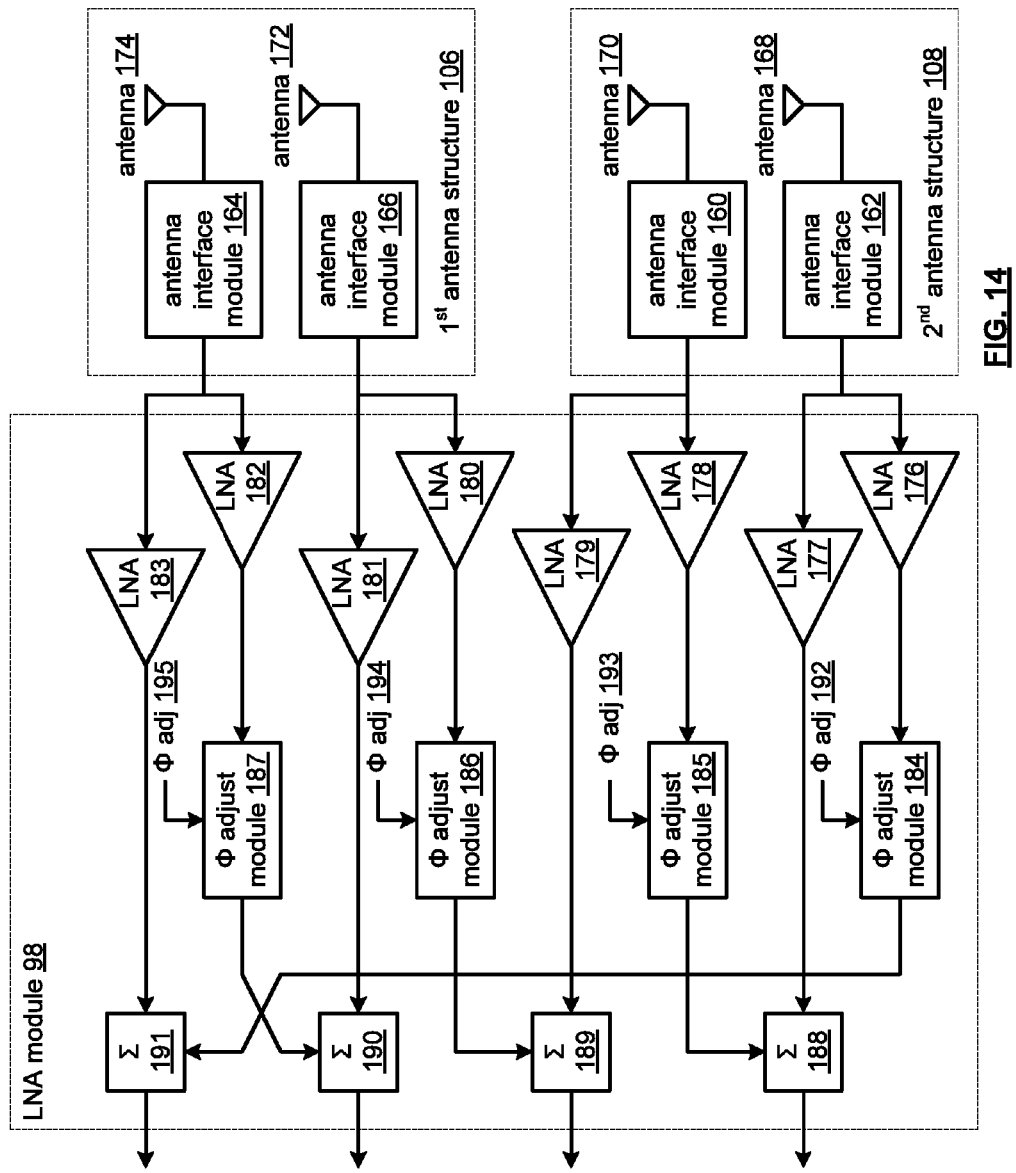
FIG. 14 is a schematic block diagram of an embodiment of a low noise amplifier module and antenna structures in accordance with the present invention.
Figure 15:
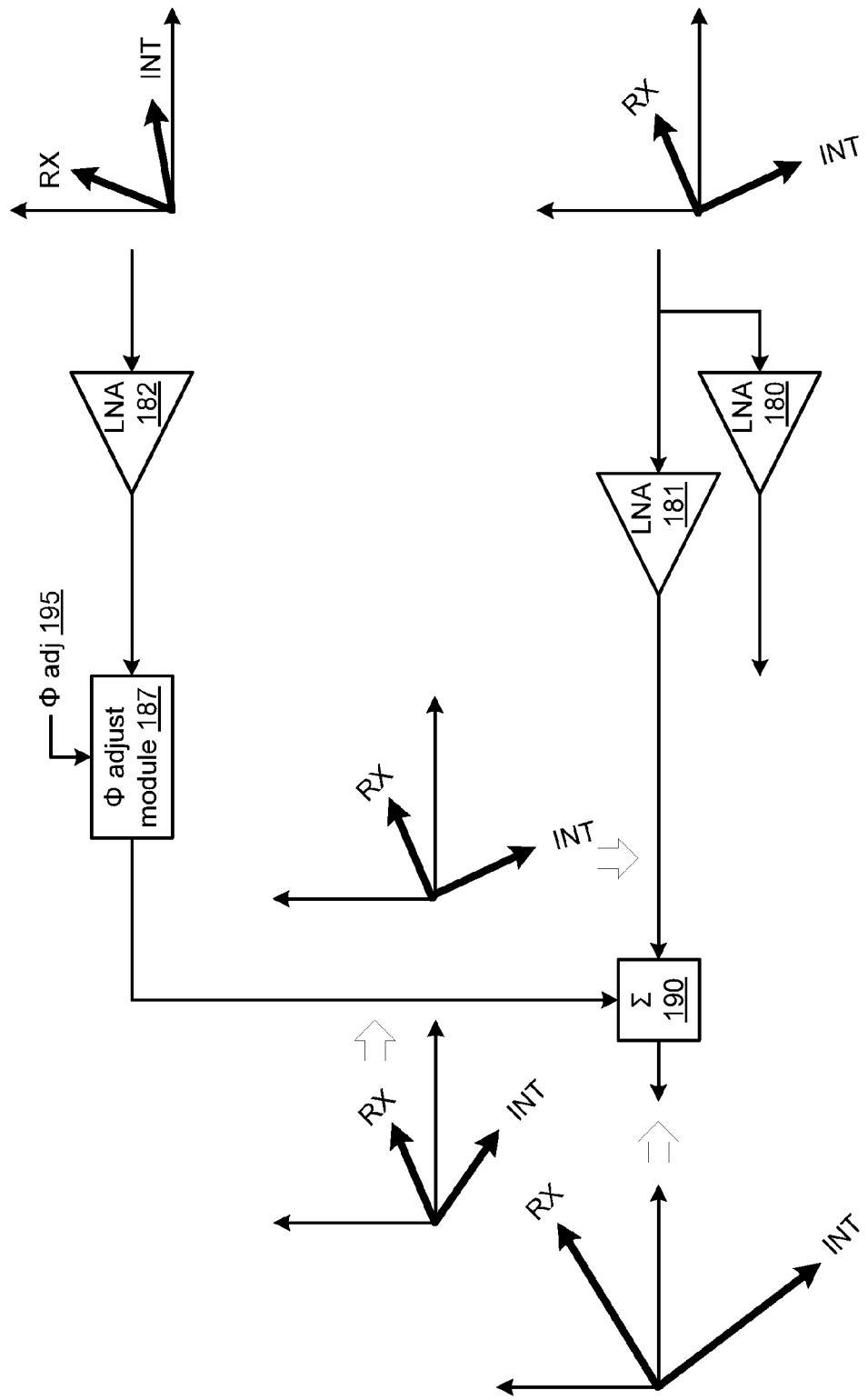
FIG. 15 is a schematic block diagram of an example of the low noise amplifier module and the antenna structures of FIG. 14.
Figure 16:
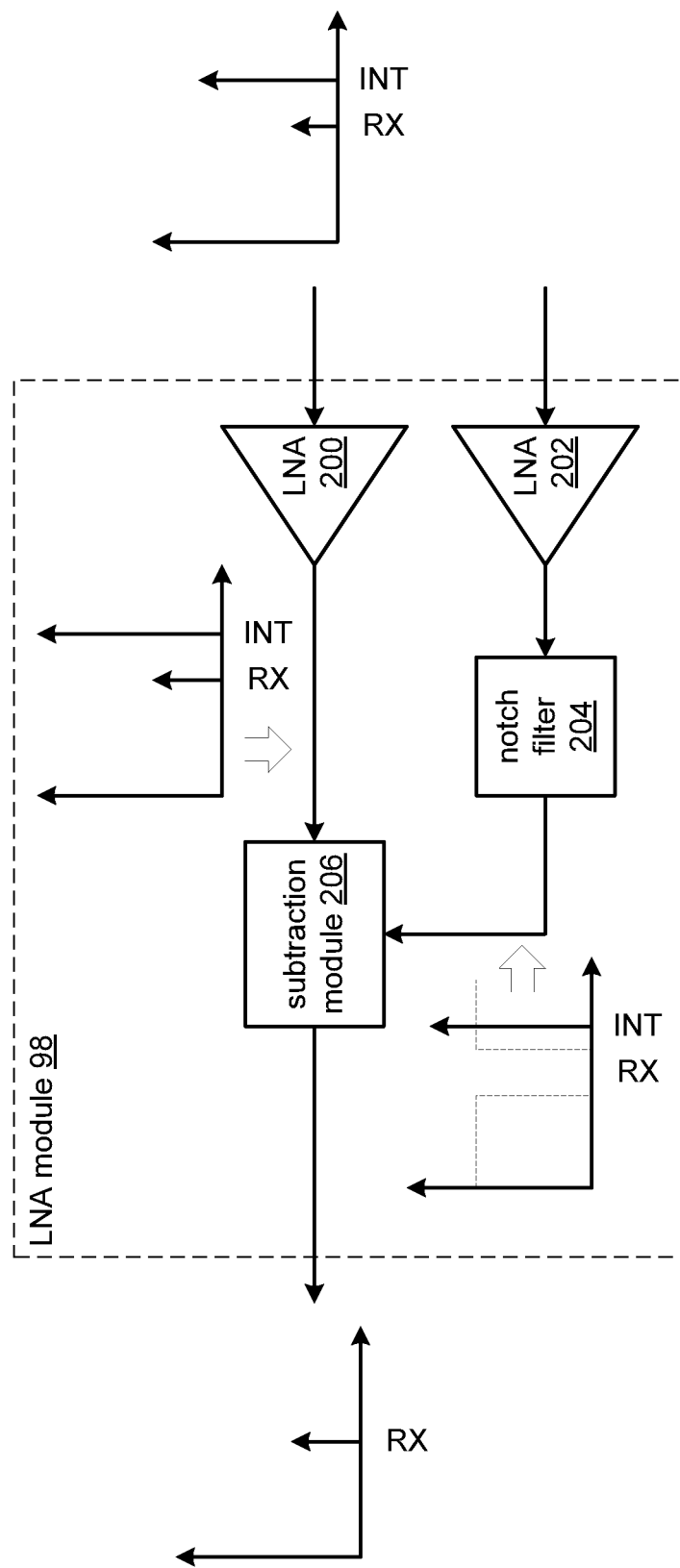
FIG. 16 is a schematic block diagram of an embodiment of a low noise amplifier module in accordance with the present invention.

If the signal strength of the inbound RF signal is greater than a certain level (e.g., greater than −50 dBm), then adequate blocking of the interferer 150 can be achieved by adjusting the effective polarization of the RX antenna(s). If, however, the signal strength of the inbound RF signal is less than the certain level, then additional blocking of the interferer 150 may be required. FIGS. 14-16 are schematic block diagrams of embodiments of the LNA module 98 that includes interferer blocking functionality.

FIG. 14 is a schematic block diagram of an embodiment of a low noise amplifier (LNA) module 98 and antenna structures 106 and 108. The LNA module 98 includes a plurality of low noise amplifiers 176-183, a plurality of phase adjust modules 184-187, and a plurality of summing modules 188-191. The first antenna structure 106 includes antennas 172-174 and antenna interface modules 164-166. The second antenna structure 108 includes antennas 168-170 and antenna interface modules 160-162. Note that each of the antennas 168-174 may be a dipole antenna, a mono pole antenna, a diversity antenna pair, a planer helical antenna, a meandering trace antenna, and/or any other antenna capable of transceiving RF signals. Further note that each of the antenna interfaces 160-144 may include a transformer balun, an impedance matching circuit, and/or a transmission line. Still further note that the adjusting of the effective polarization may be done by adjusting characteristics of the one or more antenna interface modules and/or the one or more antennas of the first and/or second receive antenna structures 106 and/or 108.

Within the LNA module 98, the plurality of low noise amplifiers 176-183 amplifies the inbound wide bandwidth RF signal received by the first and second antenna structures 106 and 108 to produce a plurality of amplified inbound wide bandwidth RF signals. Note that at least one of the plurality of low noise amplifiers amplifies the inbound wide bandwidth RF signal based on a gain adjust signal.

The plurality of phase adjust modules 184-187 adjusts phase of a set of the plurality of amplified inbound wide bandwidth signals in accordance with a phase adjust signal 192-195 to produce a set of phase adjusted inbound wide bandwidth RF signals. The plurality of summing modules 188-191 sums the remaining set of the plurality of amplified inbound wide bandwidth RF signals with the set of phase adjusted inbound wide bandwidth RF signals to produce a plurality of amplified inbound RF signals, which may be combined to produce an amplified inbound RF signal or may be processed separately and combined during baseband processing.

FIG. 15 is a schematic block diagram of an example of the low noise amplifier module 98 and the antenna structures 106 and 108 of FIG. 14. In this example, LNA 181 and LNA 182 receive the inbound wide bandwidth RF signal with different polar orientations as a result of being received from different antennas. The output of LNA 182 is phase adjusted by the phase adjust module 187 in accordance with the phase adjust signal 195. The phase adjust signal 195 is determined such that the desired inbound RF signal (RX) received by the antenna associated with LNA 182 is aligned, in polar phase, with the desired inbound RF signal (RX) received by the antenna associated with LNA 181. Note that the baseband processing module 90 may determine the phase adjust signals 192-195.

The summing module 190 sums the phase adjusted signal received from the phase adjust module 187 with the signal received from LNA 181 to produce one of the plurality of amplified inbound RF signals. In this instance, by phase aligning and summing the desired inbound RF signal component (RX), its signal strength is increased, thereby effectively reducing the adverse affects of the interferer.

FIG. 16 is a schematic block diagram of an embodiment of a low noise amplifier module 98 that includes the pair of low noise amplifiers 200 and 202, a notch filter 204, and the subtraction module 206. The LNAs 200 and 202 amplify the inbound RF signal (RX) and a blocking component corresponding to the interferer 150 (INT) to produce amplified composite inbound RF signals. The output of the LNA 202 is notched filtered by notch filter 204 to attenuate signal components within the receive frequency band (RX) and to pass signal components outside of the receive frequency band to produce a notch filtered signal.

The subtraction module 206 subtracts the notch filtered signal from the amplified composite inbound RF signal outputted by LNA 200 to produce an amplified inbound RF signal. As shown, the amplified inbound RF signal includes the desired inbound RF signal component and a substantially attenuated blocker component.

Figure 17:
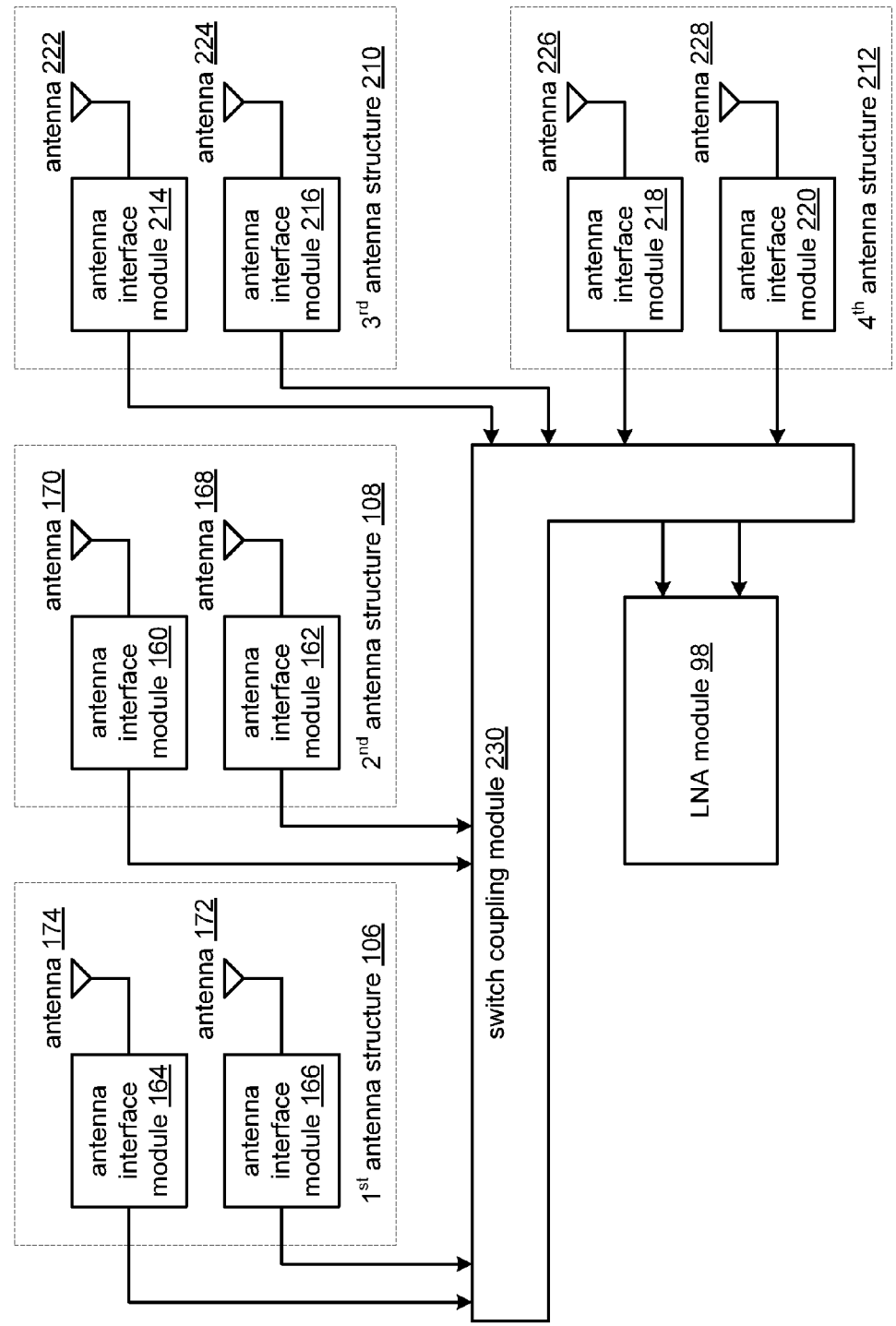
FIG. 17 is a schematic block diagram of another embodiment of a low noise amplifier module and antenna structures in accordance with the present invention.

FIG. 17 is a schematic block diagram of another embodiment of a low noise amplifier module 98 and antenna structures 96. In this embodiment, the adjustable antenna assembly 98 is configured to provide four antenna structures 106, 108, 210, and 212, each including two antennas 168-174 and 222-228 and two antenna interfaces 162-166 and 214-220. Note that the effective polarization of at least one of antenna structures is adjusted to reduce signal strength of the interferer RF signal component.

The LNA module 98 is coupled to the adjustable antenna assembly 98 by a switching coupling module 230, which may include switches, transistors, multiplexers, demultiplexer, and/or any other type of controlled coupling circuit. The switch coupling module 230 is operable to couple at least two of the antenna structures to the low noise amplifier module based on diversity selection signal.

The adjustable antenna assembly 96 may be implemented as disclosed in patent application entitled RF TRANSCEIVER WITH ADJUSTABLE ANTENNA ASSEMBLY, having a Ser. No. 11/801,940, and a filing date of May 11, 2007, now issued as U.S. Pat. No. 7,933,562, on Apr. 26, 2011, which is incorporated herein by reference.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) receiver section comprising:
an adjustable antenna assembly includes a first receive antenna structure and a second receive antenna structure configured to receive an inbound wide bandwidth RF signal that includes an interferer RF signal component with one or more outbound RF signals and a desired inbound RF signal component, the adjustable antenna assembly functions to:
  in a first configuration, determine a first signal strength of the inbound wide bandwidth RF signal and a first signal strength of the desired inbound RF signal component;
  in another configuration, determine another signal strength of the inbound wide bandwidth RF signal and another signal strength of the desired inbound RF signal component;
  determine a polarization offset based on the first signal strengths and the another signal strengths; and
  adjust an effective polarization offset based on the polarization offset by changing at least one characteristic of a plurality of characteristics of the first and second receive antenna structures to reduce signal strength of the interferer RF signal component.

2. The RF receiver section of claim 1, wherein each of the first and second receive antenna structures comprising:
one or more antenna interface modules; and
one or more antennas coupled to the one or more antenna interfaces, wherein the at least one characteristic of the plurality of characteristics of at least one of the one or more antenna interface modules and the one or more antennas are changeable to adjust the polarization offset of the first and second receive antenna structures.

3. The RF receiver section of claim 1, further comprising:
a low noise amplifier module coupled to amplify the inbound wide bandwidth RF signal received by the first receive antenna structure and to amplify the inbound wide bandwidth RF signal received by the second receive antenna structure to produce at least one amplified inbound RF signal, the low noise amplifier module including:

a plurality of low noise amplifiers coupled to amplify the inbound wide bandwidth RF signal received by the first and second receive antenna structures to produce a plurality of amplified inbound wide bandwidth RF signals;

a plurality of phase adjust modules coupled to adjust phase of a set of the plurality of amplified inbound wide bandwidth signals to produce a set of phase adjusted inbound wide bandwidth RF signals; and a plurality of summing modules coupled to sum a remaining set of the plurality of amplified inbound wide bandwidth RF signals with the set of phase adjusted inbound wide bandwidth RF signals to produce a plurality of amplified inbound RF signals of the at least one amplified inbound RF signal.

4. The RF receiver section of claim 3 further comprising:
at least one of the plurality of low noise amplifiers amplifying the inbound wide bandwidth RF signal received by the first or the second receive antenna structure based on a gain adjust signal.

5. The RF receiver section of claim 3, wherein the low noise amplifier module comprising:
a first low noise amplifier coupled to amplify the inbound wide bandwidth RF signal received by the first receive antenna structure to produce a first amplified inbound wide bandwidth RF signal;
a second low noise amplifier coupled to amplify the inbound wide bandwidth RF signal received by the second receive antenna structure to produce a second amplified inbound wide bandwidth RF signal;
a notch filtering module coupled to substantially attenuate the desired inbound RF signal component and to substantially pass the interferer RF signal component to produce a notch filtered signal; and
a subtraction module coupled to subtract the notch filtered signal from the first amplified inbound wide bandwidth RF signal to produce the at least one amplified inbound RF signal, wherein the at least one amplified inbound RF signal includes the desired inbound RF signal component and a substantially attenuated interferer RF signal component.

6. The RF receiver section of claim 3 further comprising:
a down conversion module coupled to convert the at least one amplified inbound RF signal into at least one inbound symbol stream.

7. The RF receiver section of claim 1 further comprising:
the adjustable antenna assembly is further configured to provide the first and second receive antenna structures and provide third and fourth receive antenna structures, wherein the first through fourth antenna structures receive the inbound wide bandwidth RF signal; and
a switch coupling module operable to couple at least two of the first through fourth antenna receive antenna structures to the low noise amplifier module based on diversity selection signal.

8. A radio frequency (RF) receiver section comprising:
a receive antenna structure configured to receive an inbound wide bandwidth RF signal that includes an interferer RF signal component with one or more outbound RF signals and a desired inbound RF signal component, the receive antenna structure functions to:
in a first configuration of the receive antenna structure, determine a first signal strength of the inbound wide bandwidth RF signal and a first signal strength of the desired inbound RF signal component;
in another configuration of the receive antenna structure, determine another signal strength of the inbound wide bandwidth RF signal and another signal strength of the desired inbound RF signal component;
determine a polarization offset based on the first and the another signal strength of the inbound wide bandwidth RF signal and the first and the another signal strength of the desired inbound RF signal component; and
adjust an effective polarization of the receive antenna structure based on the polarization offset by changing at least one characteristic of a plurality of characteristics to reduce signal strength of the interferer RF signal component.

9. The RF receiver section of claim 8, wherein the receive antenna structure comprising:
one or more antenna interface modules; and
one or more antennas coupled to the one or more antenna interfaces, wherein changing the at least one characteristic of the plurality of characteristics of at least one of the one or more antenna interface modules and the one or more antennas adjusts the polarization offset of the receive antenna structure.

10. The RF receiver section of claim 8, further comprising:
a low noise amplifier module coupled to amplify the inbound wide bandwidth RF signal received to produce an amplified inbound RF signal, wherein the low noise amplifier module includes:
a plurality of low noise amplifiers coupled to amplify the inbound wide bandwidth RF signal received by the first and second receive antenna structures to produce a plurality of amplified inbound wide bandwidth RF signals;
a plurality of phase adjust modules coupled to adjust phase of a set of the plurality of amplified inbound wide bandwidth signals to produce a set of phase adjusted inbound wide bandwidth RF signals; and
a plurality of summing modules coupled to sum a remaining set of the plurality of amplified inbound wide bandwidth RF signals with the set of phase adjusted inbound wide bandwidth RF signals to produce a plurality of amplified inbound RF signals of the at least one amplified inbound RF signal.

11. The RF receiver section of claim 10, further comprising:
at least one of the plurality of low noise amplifiers amplifying the inbound wide bandwidth RF signal received by the first or the second receive antenna structure based on a gain adjust signal.

12. The RF receiver section of claim 8, wherein the low noise amplifier module comprising:
a first low noise amplifier coupled to amplify the inbound wide bandwidth RF signal to produce a first amplified inbound wide bandwidth RF signal;
a second low noise amplifier coupled to amplify the inbound wide bandwidth RF signal to produce a second amplified inbound wide bandwidth RF signal;
a notch filtering module coupled to substantially attenuate the desired inbound RF signal component and to substantially pass the interferer RF signal component to produce a notch filtered signal; and
a subtraction module coupled to subtract the notch filtered signal from the first amplified inbound wide bandwidth RF signal to produce the amplified inbound RF signal, wherein the amplified inbound RF signal includes the desired inbound RF signal component and a substantially attenuated interferer RF signal component.

13. A radio frequency integrated circuit (RFIC) comprising:
- an adjustable antenna assembly configured to provide a receive antenna structure configured to receive an inbound wide bandwidth RF signal that includes an interferer RF signal component with one or more outbound RF signals and a desired inbound RF signal component, the adjustable antenna assembly functions to:
  - in a first configuration, determine a first signal strength of the inbound wide bandwidth RF signal and a first signal strength of the desired inbound RF signal component;
  - in another configuration, determine another signal strength of the inbound wide bandwidth RF signal and another signal strength of the desired inbound RF signal component;
  - determine a polarization offset based on the first and the another signal strength of the inbound wide bandwidth RF signal and the first and the another signal strength of the desired inbound RF signal component; and
  - adjust an effective polarization of the receive antenna structure based on the polarization offset by changing at least one characteristic of a plurality of characteristics to reduce signal strength of the interferer RF signal component.

14. The RFIC of claim 13, wherein the receive antenna structure comprising:
- one or more antenna interface modules; and
- one or more antennas coupled to the one or more antenna interfaces, wherein the at least one of the plurality of characteristics of at least one of the one or more antenna interface modules and the one or more antennas are changed by adjusting the polarization offset of the receive antenna structure.

15. The RFIC of claim 14, further comprising:
- a low noise amplifier module coupled to amplify the inbound wide bandwidth RF signal received to produce an amplified inbound RF signal, wherein the low noise amplifier module including:
  - a plurality of low noise amplifiers coupled to amplify the inbound wide bandwidth RF signal received by the first and second receive antenna structures to produce a plurality of amplified inbound wide bandwidth RF signals;
  - a plurality of phase adjust modules coupled to adjust phase of a set of the plurality of amplified inbound wide bandwidth signals to produce a set of phase adjusted inbound wide bandwidth RF signals; and
  - a plurality of summing modules coupled to sum a remaining set of the plurality of amplified inbound wide bandwidth RF signals with the set of phase adjusted inbound wide bandwidth RF signals to produce a plurality of amplified inbound RF signals of the at least one amplified inbound RF signal.

16. The RFIC of claim 15, further comprising:
- at least one of the plurality of low noise amplifiers amplifying the inbound wide bandwidth RF signal received by the first or the second receive antenna structure based on a gain adjust signal.

17. The RFIC of claim 13, wherein the low noise amplifier module comprising:
- a first low noise amplifier coupled to amplify the inbound wide bandwidth RF signal to produce a first amplified inbound wide bandwidth RF signal;
- a second low noise amplifier coupled to amplify the inbound wide bandwidth RF signal to produce a second amplified inbound wide bandwidth RF signal;
- a notch filtering module coupled to substantially attenuate the desired inbound RF signal component and to substantially pass the interferer RF signal component to produce a notch filtered signal; and
- a subtraction module coupled to subtract the notch filtered signal from the first amplified inbound wide bandwidth RF signal to produce the amplified inbound RF signal, wherein the amplified inbound RF signal includes the desired inbound RF signal component and a substantially attenuated interferer RF signal component.

18. The RFIC of claim 13, wherein the adjustable antenna assembly is configured to:
- provide a first receive antenna structure and a second receive antenna structure, wherein the first and second receive antenna structures receive the inbound wide bandwidth RF signal.

19. The RFIC of claim 18, wherein the low noise amplifier module comprising:
- a plurality of low noise amplifiers coupled to amplify the inbound wide bandwidth RF signal received by the first and second receive antenna structures to produce a plurality of amplified inbound wide bandwidth RF signals;
- a plurality of phase adjust modules coupled to adjust phase of a set of the plurality of amplified inbound wide bandwidth signals to produce a set of phase adjusted inbound wide bandwidth RF signals and a remaining set of the plurality of amplified inbound wide bandwidth RF signals; and
- a plurality of summing modules coupled to sum the remaining set of the plurality of amplified inbound wide bandwidth RF signals with the set of phase adjusted inbound wide bandwidth RF signals to produce a plurality of amplified inbound RF signals of the at least one amplified inbound RF signal.

20. The RFIC of claim 18, further comprising:
- the adjustable antenna assembly is further configured to provide the first and second receive antenna structures and provide third and fourth receive antenna structures, wherein at least one of the first through fourth antenna structures include the at least one characteristic of the plurality of characteristics for changing the polarization offset of at least two of the first through fourth antenna structures to reduce signal strength of the interferer RF signal component; and
- a switch coupling module operable to coupled at least two of the first through fourth antenna receive antenna structures to the low noise amplifier module based on diversity selection signal.

* * * * *